(12) United States Patent
Tan et al.

(10) Patent No.: US 6,381,357 B1
(45) Date of Patent: Apr. 30, 2002

(54) HI-SPEED DETERMINISTIC APPROACH IN DETECTING DEFECTIVE PIXELS WITHIN AN IMAGE SENSOR

(75) Inventors: Yap-Peng Tan, Chandler; Tinku Acharya, Tempe, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/258,636

(22) Filed: Feb. 26, 1999

(51) Int. Cl.[7] ................................................. G06K 9/00
(52) U.S. Cl. ....................................... 382/141; 348/246
(58) Field of Search .............................. 382/141–149; 358/482, 483, 406; 348/246, 247, 264

(56) References Cited

U.S. PATENT DOCUMENTS

| | | | |
|---|---|---|---|
| 4,498,104 A | * 2/1985 | Schulz | 348/616 |
| 4,969,198 A | 11/1990 | Batchelder et al. | |
| 5,047,861 A | 9/1991 | Houchin et al. | |
| 5,416,516 A | * 5/1995 | Kameyama et al. | 348/246 |
| 5,541,653 A | * 7/1996 | Peters et al. | 348/264 |
| 5,854,655 A | * 12/1998 | Kameyama et al. | 348/247 |

FOREIGN PATENT DOCUMENTS

EP 0762741 3/1997

OTHER PUBLICATIONS

Digital automatic pixel correction in new generation CCD broadcast cameras, by B.Botte, 1992.*

* cited by examiner

*Primary Examiner*—Joseph Mancuso
*Assistant Examiner*—Vikkram Bali
(74) *Attorney, Agent, or Firm*—Blakely, Sokoloff, Taylor & Zafman LLP

(57) ABSTRACT

What is disclosed is a method including downloading a sequence of images from an image sensor, and then marking on a map a pixel location of the sensor defective if a Defective Vote score exceeds a first threshold, the score tallied over all captured images. The defective pixel map is stored on a host computer, which performs the defective pixel detection on behalf of the sensor, rather than directly on the device incorporating the image sensor.

15 Claims, 5 Drawing Sheets

HI-SPEED DETERMINISTIC APPROACH IN DETECTING DEFECTIVE PIXELS WITHIN AN IMAGE SENSOR

BACKGROUND OF THE INVENTION

1. Field of the Invention

The invention relates generally to imaging. More specifically, the invention relates to detecting defective pixels in an image sensor.

2. Description of the Related Art

Imaging devices such as digital cameras and scanners may have as one component, an image sensor which is manufactured as a CCD (Charge Coupled Device), CID (Charge Injection Device) or CMOS (Complementary Metal-Oxide Semiconductor) device. The image sensor is composed of an array of "sense" or pixel locations which captures energy from a illuminant, often converting this energy into a concrete measure such as an intensity value. In most cases, imaging sensors will have a certain number of pixel locations which are "defective" due to fabrication or manufacturing errors. It is extremely difficult, if not impossible, to guarantee during such fabrication/manufacturing that none of the pixels in the sensor will be defective. A "defective" pixel of a sensor is one which when exposed to an illuminant will produce a different intensity value or response than that of a "fully functional" pixel when exposed to that same illuminant. In other words, the defective pixel is abnormally sensitive/insensitive to light than a fully functional pixel. Such defects if not detected and then compensated for, may cause the captured image to be of less visually perceived quality and if prominent can detract the attention of the viewer towards the defective pixel(s).

Defects in pixel locations can be split into three categories-Stuck High, Stuck Low and Abnormal Response. A Stuck High defective pixel is one which always responds to the lighting condition by producing a high intensity value. For instance, if the intensity of pixels ranges from 0 to a high of 255, a Stuck High pixel would always respond to lighting with a value of, for instance, 255, even if actual measured intensity for that location of the scene would be 25, for example, if captured by a functional pixel. A Stuck Low defective pixel is one which always responds to the lighting condition by producing a low intensity value. A Stuck Low pixel may respond with a value of 5 even though a functional pixel would show the intensity value to be 200, 100 etc. A pixel with an Abnormal Response defect has no absolute, but rather a relative variance from a functional pixel. For instance such a pixel would inaccurately respond by a particular percentage, such that, for instance, were a functional pixel would read a value X, the Abnormal Response defective pixel would respond with a value 1.25*X. The Abnormal Response is thus proportional or relative to the intensity being captured, rather than an absolute high or low. Pixels exhibiting any of these types of defects should, desirably, be corrected or compensated for.

The first step in any such compensation is the detection of which pixels are in fact "defective". Conventionally, such detection is performed by identifying the defective pixel locations in a controlled environment, such as during quality control for the sensor as a whole, after the sensor is fabricated. The identified locations are recorded and then transferred to some non-volatile memory on the device in which the sensor is used such as on a digital camera. In modern "mega-pixel" image sensors, where the total size of the sensors have on the order of 1000 by 1000 pixels, many pixels may be defective. The extra memory needed to store the defective pixel locations adds to the total cost/time-to-manufacture of the device and also requires actual data transfer during the process of assembling/integrating the sensor into the device. The defective pixel locations must be separately stored prior to device assembly into a fixed memory such as a hard disk. Once the defective locations are stored, signal processing techniques post image capture may be used to correct the defective pixels. A more arbitrary way of correction image defects, which has also been utilized, is to not detect defective pixels, but treat the unknown defects as noise and apply an image-by-image noise removal technique to the entire sensor output (image). While avoiding memory cost and data transfer during assembly, such techniques have the disadvantage of being computationally expensive to implement and of potentially reducing the sharpness of the image, which is a key to visual appearance.

For these reasons, there is a need for a method to detect and compensate for defective pixel locations without adding to the time/cost of manufacture of the device and without sacrificing image quality or adding to the computation requirements during image processing on the device in which the sensor is to be employed.

SUMMARY

What is disclosed is a method including downloading a sequence of images from an image sensor, and then marking on a map a pixel location of the sensor defective if a Defective Vote score exceeds a first threshold, the score tallied over all captured images.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
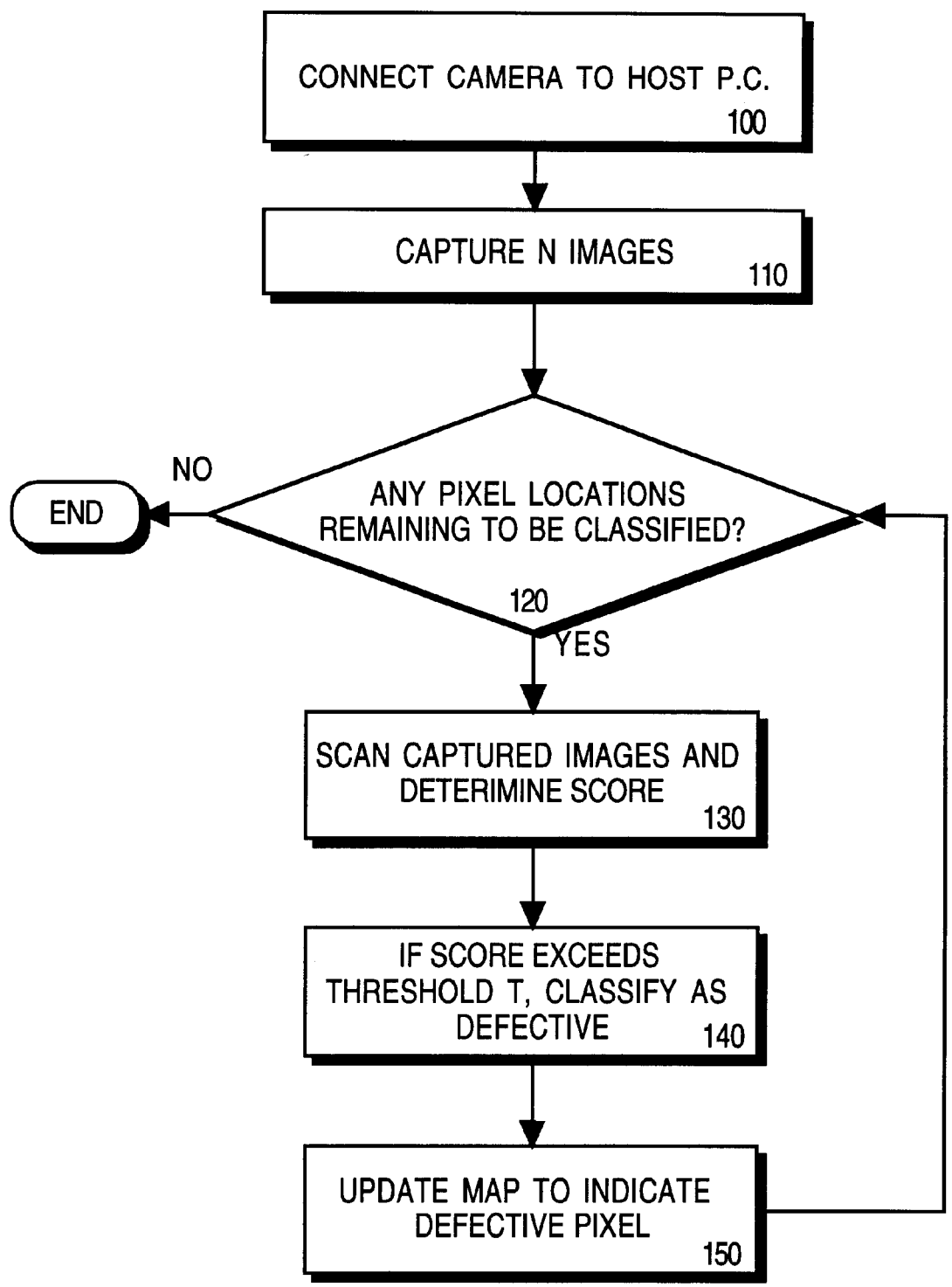
FIG. 1 is a flow diagram of an embodiment of the invention.

FIG. 1 is a flow diagram of an embodiment of the invention.

In the various embodiments of the invention, a deterministic software approach to defective pixel detection is disclosed. When an image capture device such as a digital camera is connected to host machine such as a PC (Personal Computer), this approach may be executed so that a hardware on-device map of defective pixel locations need not be maintained. A pre-defined number of input images are first scanned by the imaging device. For each pixel, a "Defective Vote" score is tallied by checking a condition which considers a neighborhood of the pixel under consideration. For each scanned image in which the condition is satisfied, the score is increased. When the score is tallied for all the scanned images, the defective decision is reached. If the pixel is found to be defective, it is written to a map stored on the host. The process is repeated until all pixel locations in the imaging device have been classified. The map of defective pixel locations is stored on the host and can be accessed when an image captured by the imaging device needs to be enhanced, filtered or otherwise processed.

With this framework in mind, FIG. 1 illustrates a logic flow that can achieve defective pixel detection in a deterministic manner. First, the camera or imaging device containing the sensor under examination is connected to a host such as a PC. Then, a series of N images are captured by the image capture device. The more images captured, the more likely that the deterministic approach is accurate. Also, as described in more detail below, the exposure time of the camera or imaging device and the nature of lighting can be controlled to increase the detection rate. Presumably, for a Stuck Low (or abnormal response) condition, the longer the exposure time of the sensor to capture the light in the same scene, the more likely that the resulting pixel values can be deterministically evaluated for defectiveness. Likewise, the Stuck High defect can be more readily detected if the exposure time is decreased a certain amount. For example, the brighter the scene, the easier it is to detect a Stuck Low or abnormal response defects. Likewise, the dimmer the scene, the easier it is to detect Stuck High defects.

Figure 2:
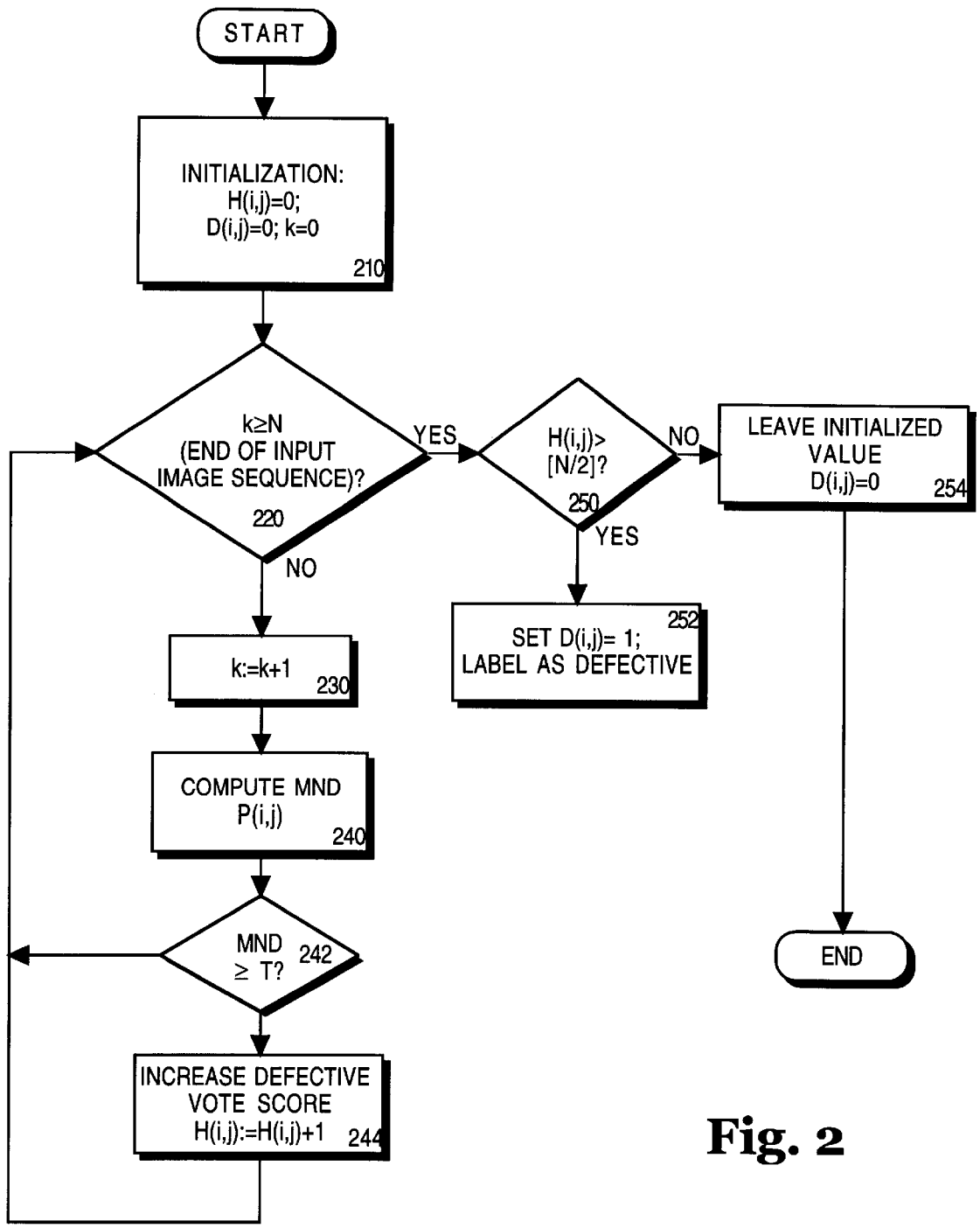
FIG. 2 is a flowchart of one embodiment of the invention.

Initially when the approach is first executed, it is assumed that all the pixel locations are unknown or in determinate (i.e., classified neither defective no r functional). For each pixel, the deterministic approach illustrated in more detail in FIG. 2 is repeated. According to one embodiment of the invention, a measurement is performed in each captured image by considering the minimum neighboring distance (MND) of surrounding pixels whether the neighborhood is composed of all monochrome pixels or only those in a particular color plane (such as Red, Green or Blue) of a Bayer Pattern CFA (Color Filter Array). Next, the MND is compared to a threshold. For the given pixel, the MND at each scanned image is compared to a threshold. Based on this comparison, a "score" is then tallied. If the score exceeds yet another threshold number, the pixel is marked defective. As each pixel is thus classified a map of defective pixel locations is stored onto the host. This process continues until all pixels in the image have been classified. Advantageously, the completed map of defective pixel locations may then be accessed so that corrective measures such as noise reduction, defective pixel replacement and other image processing mechanisms may be undertaken. This has an intended advantage of also eliminating the need for storing defective pixel location data on the sensor device, camera and also the need for determining it during manufacture. Alternatively, rather than capturing all images before processing begins, it may be possible to process each image as it is captured such that these images need not be stored and downloaded.

FIG. 2 is a flowchart of one embodiment of the invention.

FIG. 2 illustrates the basic procedure that each pixel is subjected to determine whether or not it is defective. First, an initialization step is performed to set-up the variables used in the procedure (block 210). If (i,j) represents the row (i) and column (j) location of the pixel under consideration, then D(i,j), which is the defectiveness of pixel P(i,j) is assigned the value of 0 initially since it is assumed to be functional (block 210). Likewise the Defective Vote score H(i,j) for that pixel P(i,j) is initially set to zero (block 210). A counter variable "k" used to track the current number of the captured image being used for the tally is also set to zero (block 210).

At block 220, the count k is compared against N, the total number of images captured for the purpose of defective pixel detection. If k<N, then the score tallying proceeds (to block 230); otherwise, when the last image has been utilized in tallying the score, the defective pixel image map is written out with the value of D(i,j) (block 250). During score tallying, first, the variable k, which was initially zero, is incremented by 1 to indicate which captured image is currently being considered for the tally (block 230). The tally is determined by first computing the MND about the pixel P(i,j) (block 240). The MND is then compared to a pre-defined threshold T (block 242). The value of T may be chosen depending upon a number of device dependent factors, such as sensor noise and/or the desired "false positive" rate (the rate of mis-classifying functional pixels as defective) and the "false negative" rate (the rate of mis-classifying a defective pixel as functional). While ideally both should be avoided, in most cases it is more acceptable to have false positives than false negatives. The threshold T may also be determined at the time of sensor/device quality control testing and stored on or provided with the device.

If the MND does exceed the threshold T, then the score H(i,j) is increased by 1 (block 244). If not, H(i,j) remains at its former value. This vote tallying according to the MND, which is illustrated in blocks 230–244, is continued until k>N, i.e. until the last of the captured images is utilized in the tally. When the last of captured images have been analyzed for the tally, the score H(i,j) is compared to [N/2], where [x] is the number x rounded to the nearest integer and N is the total number of images captured. If for instance, 5 images are captured, then if the score meets or exceeds [N/2] or 3, then the pixel P(i,j) is considered to be defective, and the value D(i,j) is set to one (block 252). If not, the value D(i,j) remains zero from its initialization. The threshold [N/2] is only by way of example and may be modified in accordance with the desired detection characteristic (such as modifying false positive and false negative rates and sensor characteristics.

Figure 3:
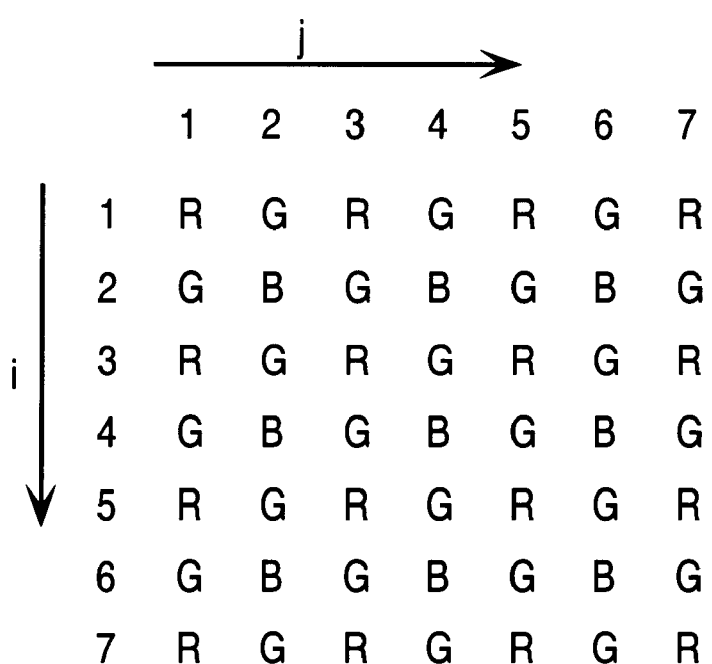
FIG. 3 shows the determining of an MND (Minimum Neighboring Distance) according to an embodiment of the invention.

FIG. 3 shows the determining of an MND (Minimum Neighboring Distance) according to an embodiment of the invention.

A minimum neighboring distance (MND) for a given pixel P(i,j) may be determined by considering the "distance" or differentials between neighboring pixel values and that given value. This may be expressed by the following statement:

$MND(P(i,j)) = minimum_r\{|P(i,j) - P(m,n)|\}$, where (m,n) is a set of locations of neighboring pixels N about the location (i,j) and r is the rank order of a minimum chosen from the set of resulting differences.

FIG. 3 shows a typical Bayer pattern sensor array of pixels about a location (i,j). In such sensors it is often desirable to consider only those neighboring pixels in the same color plane (R(ed), G(reen) or B(lue)). In the Bayer pattern array a first row of the array has pixel locations associated by alternating R and G planes and the subsequent row with pixel locations associated by alternating G and B color planes. The neighborhood N for each pixel location will depend upon the color plane association of the pixel P(i,j). The array of FIG. 3 is 7 rows by 7 columns and shows an RGB Bayer pattern. A neighborhood N for the B pixel P(4,4) that can be considered for computing the MND of P(4,4) would include 8 of the nearest neighboring B associated pixels namely those at (2,2), (2,4), (2,6), (4,2), (4,6), (6,2), (6,4) and (6,6).

The MND tells roughly how close to neighboring pixels a certain pixels response is. Assume that r=1 such that the lowest ranking difference is taken to be the chosen minimum. The MND of P(4,4) considering the above neighborhood would be found by taking the absolute value difference of the intensity value P(4,4) and each of the pixels belonging to the neighborhood. Then, the minimum of these eight (in the case of P(4,4)) "distances" would become the MND. For instance, consider the following intensity values for the neighborhood N about P(4,4): P(2,2)=100, P(2,4)=90, P(2,6)=95, P(4,2)=105, P(4,6)=110, P(6,2)=85, P(6,4)=80 and P(6,6)=75. If P(4,4), the pixel under consideration, has an intensity value of 102, the minimum neighboring distance would be (102−100)=2. If r were equal to 2, then the $2^{nd}$ lowest difference (102−105)=3 is chosen. The rank order can be changed depending on whether similar types of defects are to be found in a neighborhood.

Likewise, a neighborhood N for the R pixel P(3,3) that can be considered for computing the MND of P(3,3) would include 8 of the nearest neighboring B associated pixels namely those at (1,1), (1,3), (1,5), (3,1), (3,5), (5,1), (5,3) and (5,5). A neighborhood N for the G pixel P(3,4) that can be considered for computing the MND of P(3,4) would include 8 of the nearest neighboring G associated pixels namely those at (2,3), (2,5), (1,4), (4,3), (4,5), (5,4), (3,6) and (3,2). In general, for B or R pixels P(i,j) neighborhoods N are composed of pixels at (i−2,j−2), (i,j−2), (i+2,j−2), (i−2,j), (i+2,j), (i−2,j+2), (i,j+2), and (i+2,j+2). Likewise, in general, G pixels P(i,j) have a neighborhood N of (i−1,j−1), (i+1,j−1), (i−2,j), (i+2,j), (i−1,j+1), (i+1,j+1), (i,j−2) and (i,j+2). Where image boundaries are exceeded, such values are simply excluded in the neighborhood. Though the exemplary sensor array of FIG. 3 is an RGB sensor, any kind of color filter array pattern (or even a monochrome pattern sensor array can also be processed by the above procedure. The above neighborhoods are given by way of example and may be modified as necessary.

Figure 4:
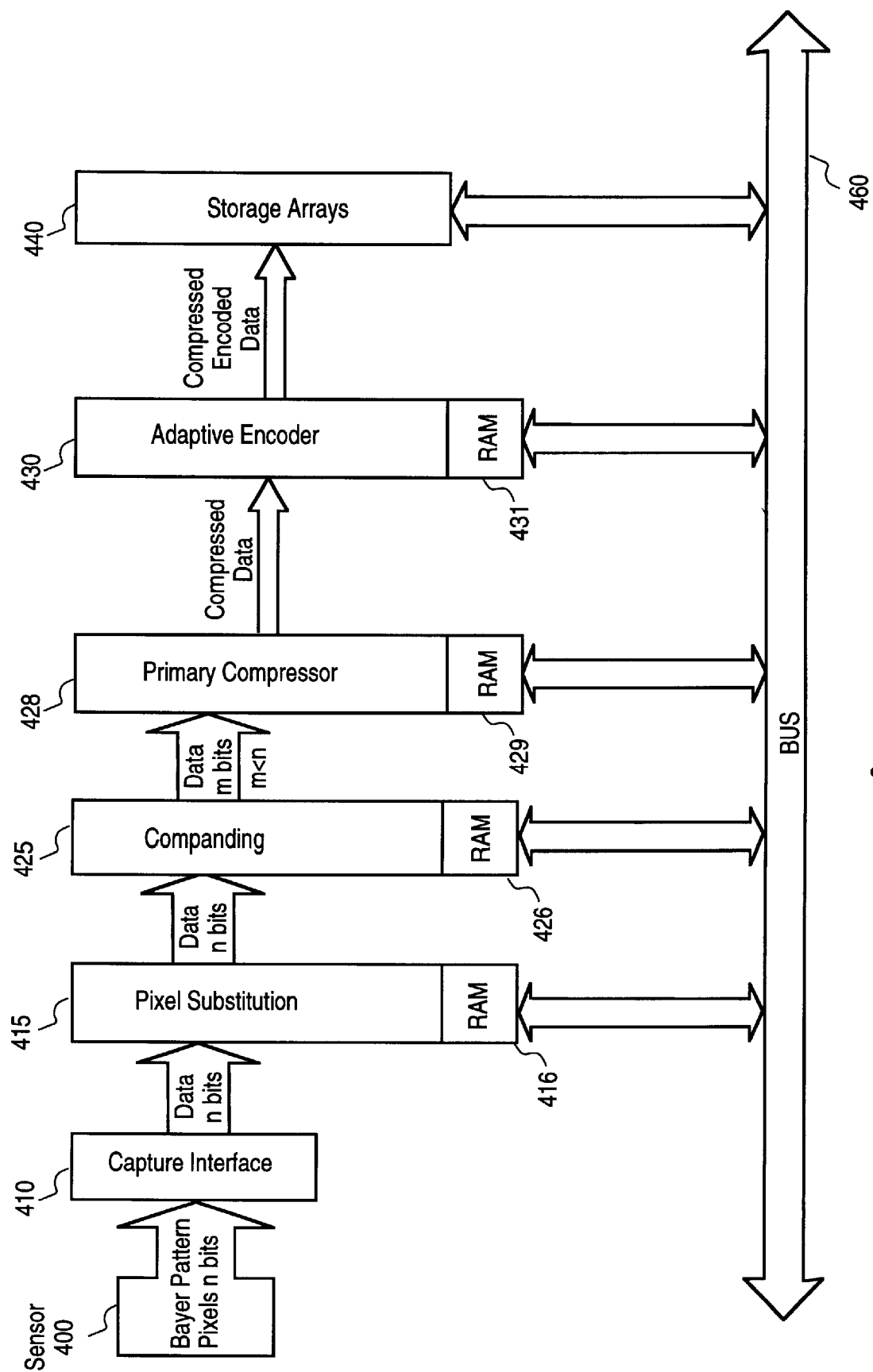
FIG. 4 is a block diagram of an image processing apparatus according to an embodiment of the invention.

FIG. 4 is a block diagram of an image processing apparatus according to an embodiment of the invention.

FIG. 4 is a block diagram of internal image processing components of an imaging device incorporating at least one embodiment of the invention. In the exemplary circuit of FIG. 4, a sensor 400 generates pixel components which are color/intensity values from some scene/environment. The n-bit pixel values generated by sensor 400 are sent to a capture interface 410. Sensor 400 in the context relating to the invention will typically sense one of either R, G, or B components from one "sense" of an area or location. Thus, the intensity value of each pixel is associated with only one of three (or four if G1 and G2 are considered separately) color planes and may form together a Bayer pattern raw image. These R, G and B color "channels" may be compressed and encoded separately or in combination, whichever is desired by the application. Capture interface 410 resolves the image generated by the sensor and assigns intensity values to the individual pixels. The set of all such pixels for the entire image is in a Bayer pattern in accordance with typical industry implementation of digital camera sensors.

Figure 5:
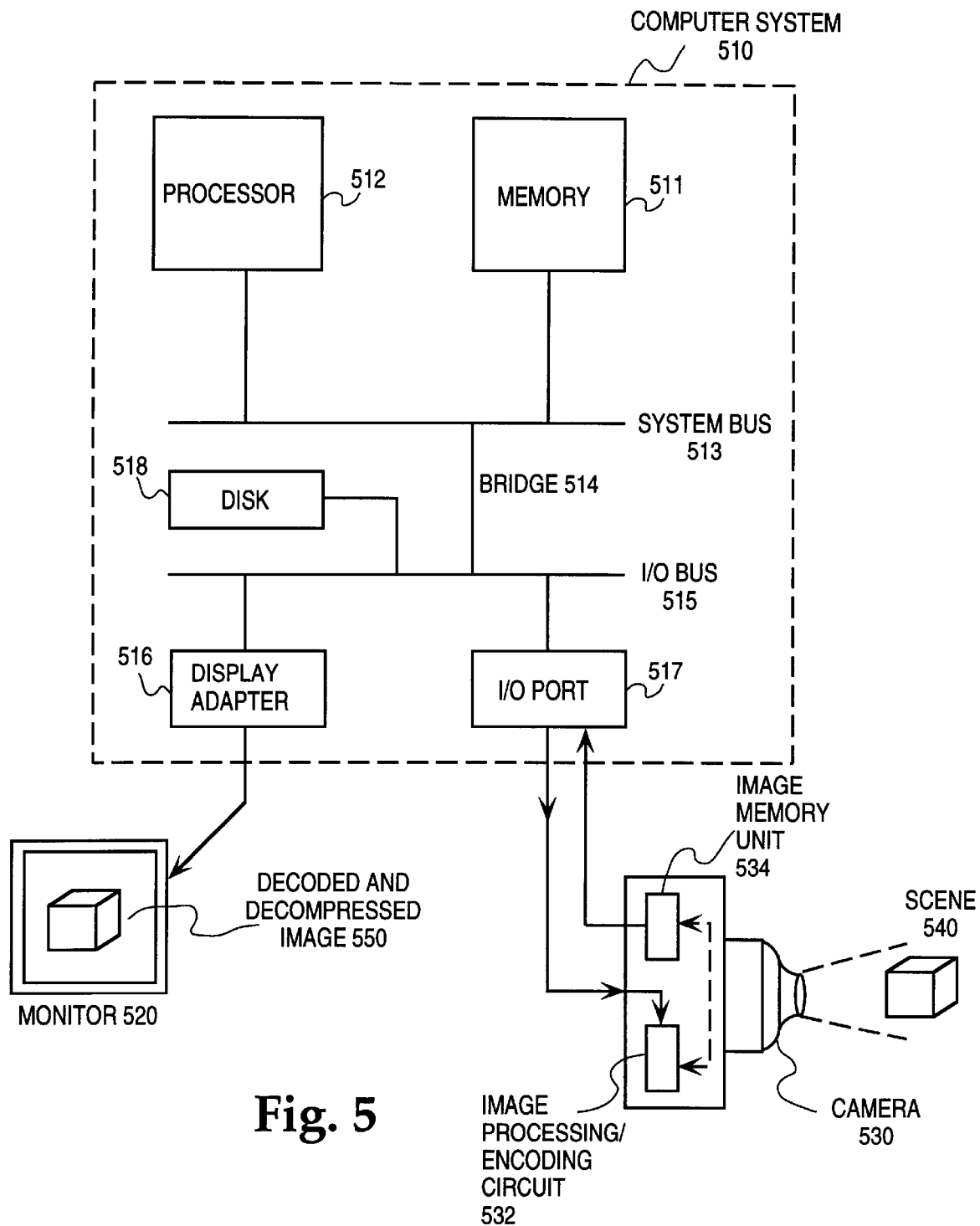
FIG. 5 is a system diagram of one embodiment of the invention.

It is typical in any sensor device that some of the pixel cells in the sensor plane may not respond to the lighting condition in the scene/environment properly. As a result, the pixel values generated from these cell may be defective. These pixel locations are called "defective pixels." In one embodiment of the invention, a "pixel substitution" unit 415 may replace the value read out in each dead pixel by the intensity value immediate previously valid pixel in the row. A RAM 416 consists of the row and column indices of the dead pixels, which are supplied by the defective pixel substitution methodologies presented in various other embodiments. The methodology for detecting which pixels in the sensor are defective may be carried out by a computer system or other such device as illustrated in FIG. 5. The resulting tally of row and column indices of the defective pixel locations may be loaded into RAM 416 via the bus 460 which facilitates data transfer in bi-directional capacity between the imaging apparatus and external devices. In an alternate embodiment substitution unit 415 may be eliminated from the imaging apparatus in favor of some form of post-processing, such as filtering or averaging, after the image is downloaded or is ready to be displayed.

In the imaging apparatus, companding module 425 is designed to convert each original pixel of n-bit (typically n=10) intensity captured from the sensor to an n-bit intensity value, where m<n (typically, m=8). Companding module 425 is not needed if the sensor 400 and capture interface 410 provide a standard 8-bit per-pixel value. Defective pixel detection should be performed in accordance with the relevant intensity range of the sensor which if originally is a higher bi-resolution such as 10-bit, should consider the high end of the intensity range to be 1023 and not 255 (for 8-bit intensity values) as discussed above.

A primary compressor 428 receives companded sensor image data and performs image compression such as JPEG. A RAM 429 can be used to store coefficients and/or quantization thresholds utilized in executing such compression. Primary compressor 428 can be designed to provide outputs which are sensitive to or corrective of defective pixel locations and their values, sending such compressed values to Encoder/Data Packer 430. When the defective pixel location map is being generated on an information device to which the imaging device of FIG. 5 is connected, the deterministic approach described above is best performed on pixels prior to their being compressed.

Each of the RAM tables 416, 426, 429 and 431 can directly communicate with a bus 460 so that their data can be loaded and then later, if desired, modified. Further, those RAM tables and other RAM tables may be used to store intermediate result data as needed. When the data in storage arrays 440 is ready to be transferred external to the imaging apparatus of FIG. 4 it may be placed upon bus 460 for transfer. Bus 460 also facilitates the update of RAM tables 416, 426, 429 and 431 as desired. Depending on the design of the apparatus, a diagnostic capture mode may be provided that performs limited or no compression and no data correction while the identifying defective pixels is being undertaken.

FIG. 5 is a system diagram of one embodiment of the invention.

FIG. 5 illustrates a computer system 510, which may be any general or special purpose computing or data processing machine such as a PC (personal computer), coupled to a camera 530. Camera 530 may be a digital camera, digital video camera, or any image capture device or imaging system, or combination thereof and is utilized to capture an image of a scene 540. Essentially, captured images are processed by an image processing circuit 532 so that they can be efficiently stored in an image memory unit 534, which may be a RAM or other storage device such as a fixed disk. The image(s) contained within image memory unit 534 that is destined for computer system 510 can be according to one embodiment of the invention, for the purpose of determining the defective pixel locations of the camera 530. In most digital cameras that can perform still imaging, images are stored first and downloaded later. This allows the camera 530 to capture the next object/scene quickly without additional delay. The use of a computer system 510, particularly in detecting defective pixel locations of the camera, reduces the computation/storage requirements of the camera 530 allowing for a less complex and thus, more inexpensive manufacture.

The image processing circuit 532 carries out the pixel substitution (if any), companding and compression of images captured by the camera 530. When a captured image, whether compressed or raw, is downloaded to computer system 510, it may be decoded and then rendered to some output device such as a printer (not shown) or to a monitor device 520. The execution of the defective pixel detection methodology described above, and image decompression, if needed, may be achieved using a processor 512 such as the Pentium™ processor with MMX Technology (a product of Intel Corporation) and a memory 511, such as RAM, which is used to store/load instruction addresses and result data.

The application(s) used to perform the detecting of defective pixels based on a series of images downloaded from camera 530 may be from an executable compiled from source code written in a language such as C++. The instructions of that executable file, which correspond with instructions necessary to scale the image, may be stored to a disk 518 or memory 511. Further, such application software may be distributed on a network or a computer-readable medium for use with other systems.

When an image, such as an image of a scene 540, is captured by camera 530, it is sent to the image processing circuit 532. Image processing circuit 532 consists of ICs and other components which may execute, among other functions, the compression of the image pixel data set compensated by defective pixel correction. The image memory unit 534 will store the compressed/encoded image data. Once all pixels are processed and stored or transferred to the computer system 510 for rendering the camera 530 is free to capture the next image. When the user or application desires/requests a download of images, the encoded image data in the image memory unit, are transferred from image memory unit 534 to the I/O port 517. I/O port 517 uses the bus-bridge hierarchy shown (I/O bus 515 to bridge 514 to system bus 513) to temporarily store the data into memory 511 or, optionally, disk 518. Computer system 510 has a system bus 513 which facilitates information transfer to/from the processor 512 and memory 511 and a bridge 514 which couples to an I/O bus 515. I/O bus 515 connects various I/O devices such as a display adapter 516, disk 518 and an I/O port 517, such as a serial port. Many such combinations of I/O devices, buses and bridges can be utilized with the invention and the combination shown is merely illustrative of one such possible combination.

According to one embodiment of the invention, the detecting of defective pixels may be achieved on computer system 510 by downloading and analyzing a series of images from camera 530. The defective pixel location data may be stored in a disk, memory 511 or other storage mechanism and can be used in perform correction or enhancement of any downloaded image. Post download correction of defective image locations eliminates the need for incorporating such features into the camera 530. Computer system 510 during defective pixel detection will perform such computations as the computation of MNDs, comparing these to a threshold, tallying the Defective Vote score and storing of a defective pixel map.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:

downloading a sequence of images from an image sensor;

determining for each image of the sequence of images a minimum neighboring distance about a pixel by computing an absolute value of intensity value differences between said pixel location and each of a set of neighboring pixel locations in said each image and finding a minimum among said absolute value of intensity value differences, said minimum set to be the minimum neighboring distance; and marking on a map the pixel location of said sensor defective if a Defective Vote score incorporating the minimum neighboring distance exceeds a first threshold, said score tallied over all said captured images, wherein incorporating the minimum neighboring distance includes increasing said Defective Vote score by one if said minimum neighboring distance exceeds a second threshold.

2. A method according to claim 1 wherein downloading includes:

connecting said sensor to a host computer; and capturing said images using said sensor.

3. A method according to claim 2 wherein capturing of images includes increasing the exposure time of s aid sensor to a given scene when detecting Stuck Low defects.

4. A method according to claim 2 wherein capturing of images includes decreasing the exposure time of said sensor to a given scene when detecting Stuck High defects.

5. A method according to claim 1 wherein the neighborhood of said neighboring pixels is determined in accordance with the color plane association of said pixel location whose defectiveness is being determined.

6. A method according to claim 5 wherein said minimum is chosen not to be the lowest ranking difference.

7. A method according to claim 1 wherein said sensor is arranged in a Bayer pattern.

8. A method according to claim 1 wherein said first threshold is the number of images downloaded divided by a fixed number, said fixed number determined by the level of false positive and false negative rate.

9. A method according to claim 1 wherein said sensor is incorporated in a digital camera.

10. An article comprising a computer readable medium having instructions stored thereon which when executed causes:

downloading a sequence of images from an image sensor;

determining for each image of the sequence of images a minimum neighboring distance about a pixel by computing an absolute value of intensity value differences between said pixel location and each of a set of neighboring pixel locations in said each image and finding a minimum among said absolute value of intensity value differences, said minimum set to be the minimum neighboring distance; and marking on a map the pixel location of said sensor defective if a Defective Vote score incorporating the minimum neighboring distances exceeds a first threshold, said score tallied overall said captured images, wherein incorporating the minimum neighboring distance includes increasing said Defective Vote score by one if said minimum neighboring distance exceeds a second threshold.

11. An article according to claim 10 wherein said downloading is caused by:

connecting said sensor to a host computer; and capturing said images using said sensor.

12. A system comprising:

a memory capable of storing instructions and data related to defective pixel detection;

a processor coupled to said memory, said processor adapted to execute said instructions and manipulate said data to determine which pixels of an image sensor are defective, said instructions including:

downloading a sequence of images from an image sensor;

determining for each image of the sequence of images a minimum neighboring distance about a pixel by computing an absolute value of intensity value differences between said pixel location and each of a set of neighboring pixel locations in said each image and finding a minimum among said absolute value of intensity value differences, said minimum set to be the minimum neighboring distance; and marking on a map the pixel location of said sensor defective if a Defective Vote score incorporating the minimum neighboring distance exceeds a first threshold, said score tallied overall said captured images, wherein incorporating the minimum neighboring distance includes increasing said Defective Vote score by one if said minimum neighboring distance exceeds a second threshold.

13. A system according to claim 12 further comprising:

an image sensor providing data in the form of pixel intensity values, said sensor adapted to capture each said image.

14. A system according to claim 13, comprising:

a defective pixel location memory adapted to store locations of pixels determined defective.

15. A system according to claim 14 wherein image captures of said sensor are corrected in those pixel locations determined to be defective.

* * * * *